March 24, 1964 J. GERMAIN ETAL 3,126,514

NOISE REDUCING SYSTEM

Filed Oct. 13, 1961

INVENTORS
JOHN W. BATTIN
JACK GERMAIN
JOHN F. MITCHELL

BY Mueller & Aichele

ATTYS.

United States Patent Office
3,126,514
Patented Mar. 24, 1964

3,126,514
NOISE REDUCING SYSTEM
Jack Germain, Chicago, John W. Battin, Addison, and John F. Mitchell, Elmhurst, Ill., assignors to Motorola, Inc., Chicago, Ill., a corporation of Illinois
Filed Oct. 13, 1961, Ser. No. 144,936
14 Claims. (Cl. 325—479)

Figures 1, 2, 3:
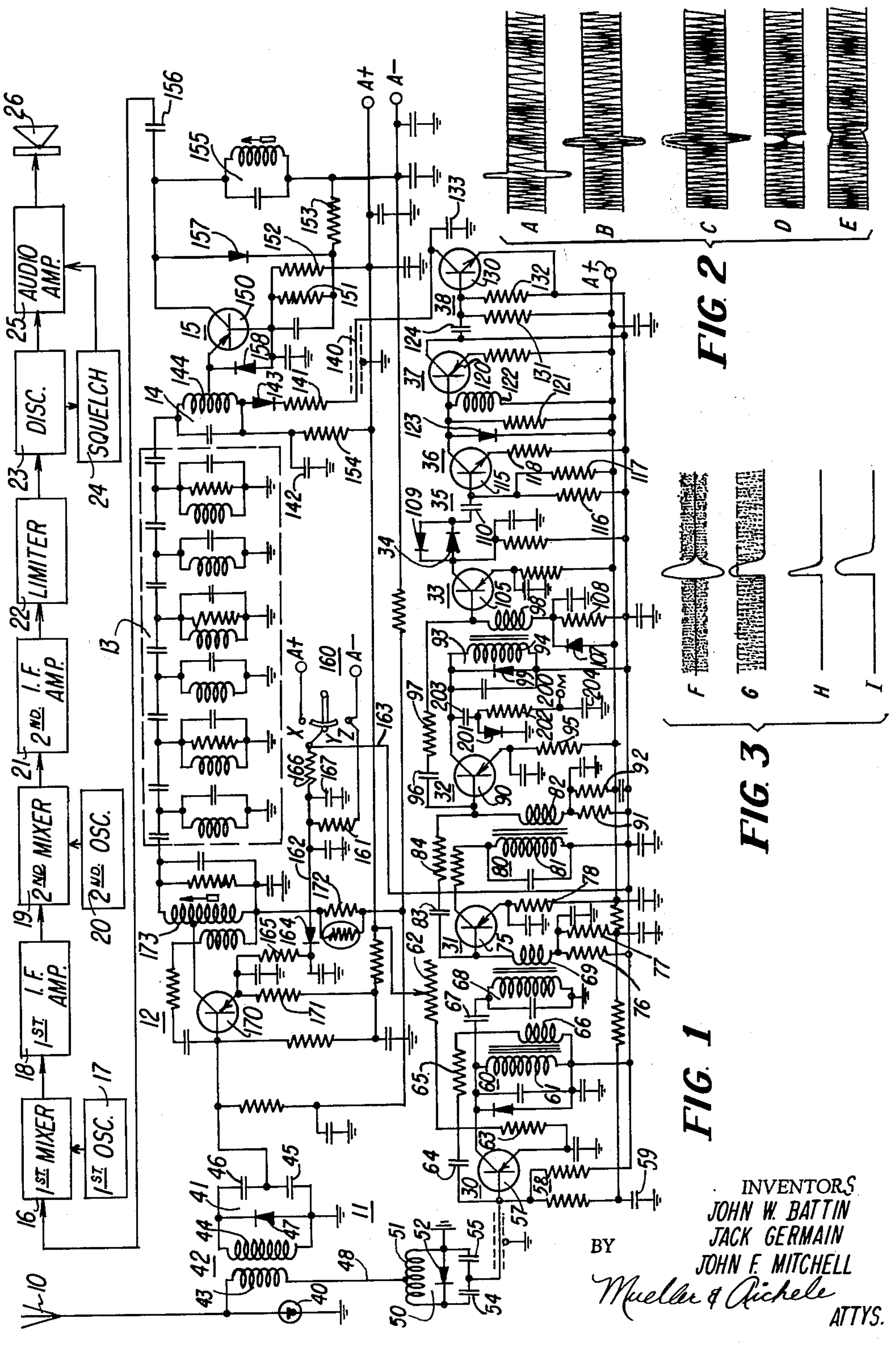

This invention relates in general to noise eliminators in radio receivers and in particular to an impulse noise blanker circuit for operation in the radio frequency portion of communications receivers.

It is generally known that impulse noise disturbances which are superimposed upon a carrier wave signal can seriously impair the translation of the desired signal within the radio receiver. Such impulse noise impairs signal translation because the receiver, as a result of its selective circuits, stretches extremely narrow spikes appearing at the antenna to relatively broad disturbances whose time base approaches that of the modulation. The problem may be particularly critical in mobile communications equipment where impulse noise energy from ignition systems, high voltage leakage, lightning flashes and the like are coupled to a highly sensitive receiver and appear as undersirable audio output. It may be further aggravated if the receiver is operating in a fringe area where the level of strength of the received carrier wave is relatively weak.

Many types of devices are known for minimizing or eliminating such noise disturbances. Some systems attempt to neutralize the disturbance pulses by applying complementary pulses in an intermediate portion of receiver. Other systems detect noise disturbances and generate blanking pulses in response thereto for turning off a stage in the receiver during the occurrence of such noise disturbances. One such system of the latter type is described and claimed in Patent No. 2,901,601 issued to Roy A. Richardson and Jona Cohn, August 25, 1959, and assigned to the assignee of the present invention. The system of the present invention is an improvement over the system described in this prior patent. When blanking in an intermediate stage of the receiver, as described in the patent, the noise disturbances to be blanked have already been translated by the radio frequency section of the receiver and consequently have been stretched to a certain degree by the selective circuits therein. To then blank out such noise pulses may result in the elimination, or a "chopping out," of a substantial portion of the carrier wave signal itself. Further, the blanker action may not be rapid enough to eliminate heavy concentrations or bursts of impulse noise. In addition, and particularly in transistorized circuitry, disabling of a radio stage may not entirely prevent signal leakage through the stage by virtue of the inherent capacity across the transistor amplifier element.

It is therefore an object of the present invention to provide an improved noise blanking system for a radio receiver which has a minimum effect upon the signal translation performance of the receiver.

Another object is to provide a radio receiver with a noise blanking system which is operative with the radio frequency section of the receiver to provide an improved and faster rate of blanking action.

Another object is to provide a noise blanking system for a radio receiver which may be operative on a frequency other than the frequency of the carrier wave signal thereby improving intermodulation and de-sensitization characteristics.

Still another object is to provide a noise blanking system for a radio stage in a receiver wherein optimum isolation is maintained between the stage being blanked and the remaining portion of the receiver.

A feature of the invention is the provision of a radio receiver with a noise blanking system which includes radio amplifying stages coupled to a portion of the receiver antenna circuit and pulse detection and amplifying stages to form blanking pulses with a coupling circuit for applying the same to blank a receiver radio frequency stage during the occurrence of impulse noise disturbances.

A further feature is the provision of such a noise blanking system which includes tunable circuits for providing an operating frequency other than the desired carrier wave signal frequency, thereby obtaining improved protection from intermodulation and related interferences.

Another feature is the provision of such a noise blanking system which is operative to turn off a stage in the radio frequency portion of the receiver during the occurrence of impulse noise disturbances and wherein the receiver stage being so blanked includes a clamping diode connected across its output circuit to provide optimum isolation during blanking action and prevent signal leakage therefrom.

Another feature is the provision of such a noise blanking system which includes a pulse detector and a gating diode connected thereto to pass only detected noise pulses above a predetermined level of amplitude.

Still another feature is the provision of such a noise blanking system wherein a switch is included to optionally render said system operative and inoperative and to modify the gain characteristics of the associated receiver to provide further protection against intermodulation and the like interferences.

In the drawings:

FIG. 1 is a partial block and schematic diagram of a radio receiver incorporating the present invention; and FIGS. 2 and 3 are graphic representations of signal wave forms at various points in a receiver circuit.

In practicing the invention a radio communications receiver is provided with a noise blanking system operative to detect noise disturbances above the carrier signal level and to apply blanking pulses in response thereto to a stage of the radio receiver to turn off the stage during the occurrence of such noise disturbances. The noise blanking system is operative within the radio frequency portion of the receiver to provide blanking action before such noise disturbances are stretched in subsequent tuned circuits of the receiver thereby providing maximum blanking efficiency by minimizing the loss of usable carrier signal. The noise blanking system may be operated at a frequency other than the desired carrier wave signal thereby improving the protection from intermodulation, cross-modulation and like interferences.

Signals are applied directly from the receiver antenna circuit to a radio frequency amplifier and then detected to translate impulse noise disturbances above the carrier level into pulses. A diode gate is incorporated to pass detected noise pulses only above a predetermined level of amplitude. The detected noise pulses are filtered through a high pass filter to strip off undesired signals within the pass band range of the receiver. The filtered pulses are amplified, stretched a predetermined time duration and utilized to turn off a radio frequency stage in the receiver for the duration of the applied pulse. A clamping diode is included in the output circuit of the receiver radio frequency stage being blanked, and which is operative in response to blanking pulses to clamp the output electrode to a reference potential thereby providing further protection from pulse leakage therefrom to the remainder of the receiver.

In FIG. 1 there is illustrated a frequency modulation communication receiver of the double intermediate frequency type. It is to be understood however that the invention is not limited to use in any particular receiver.

An antenna 10 is connected to an antenna tuned circuit 11 which includes transformer 42 having a primary winding 43 and secondary winding 44. Signals from antenna 10 are coupled to the tuned circuit 41 consisting of winding 44 and capacitors 45 and 46. The junction of capacitors 45 and 46 forms the signal feed to the first radio frequency amplifier stage 12. From the output of stage 12 the signal is fed into a delay line 13 and developed across tuned circuit 14 which forms the input to the second radio frequency amplifier stage 15. The output of stage 15 is connected to first mixer stage 16 and the signal is converted to a first intermediate frequency by a fixed signal from oscillator stage 17. The converted signal is amplified in first intermediate frequency amplifier stage 18 and fed to a second mixer stage 19 where the signal is converted to a second intermediate frequency by a fixed signal from second oscillator stage 20. The converted signal is amplified in second intermediate frequency amplifier stage 21 and applied to limiter stage 22, the output of which is coupled to discriminator 23 which demodulates the intelligence portion of the carrier signal. The intelligence signal is amplified to a desired level by audio amplifier stage 25 and rendered audible by loudspeaker 26. Squelch action is provided by stage 24 operating in a well known manner.

In addition to the signal channel just described, the receiver also includes a blanker channel. This channel is joined to the signal channel by tuned circuit 50, coupled to primary winding 43 of antenna transformer 42. In like manner, signals from antenna 10 are developed across tuned circuit 50 consisting of secondary winding 51 and capacitors 54 and 55. The blanker channel includes a radio frequency amplifier stage 30 having an input connected to the junction of capacitors 54 and 55. Bias for transistor 57 of stage 30 is obtained from the voltage divider network 58, with bypass being effected by capacitor 59. Operating voltage is supplied through coil 61 of tuned circuit 60 to the collector electrode. Amplifier stage 30 is neutralized in a known manner by the feedback network consisting of capacitor 64 and resistor 65 connected in series between secondary winding 66 and the base electrode. The gain of transistor 57 may be adjusted by potentiometer 62 and resistor 63 connected in series between the emitter electrode and the positive side of the power source. Control of the gain provides an effective compensation for variations in the parameters of the transistor, as well as frequency characteristics and other related environmental conditions.

The output of amplifier stage 30 is applied through coupling capacitor 67 to tuned circuit 68. Secondary winding 69 forms the input to a second radio frequency amplifier stage 31. Bias is supplied to transistor 75 by a voltage divider network consisting of resistors 76 and 77. Resistor 78 forms the emitter load. The output is developed across tuned circuit 80. Transistor 75 is neutralized by capacitor 83 and resistor 84 connected in series between the base electrode and secondary winding 82. Operating voltage is applied through coil 81 to the collector electrode. Secondary winding 82 forms the input to radio frequency amplifier stage 32 with bias to transistor 90 being supplied by the voltage divider network formed by resistors 91 and 92. Operating voltage is supplied through coil 94 of tuned circuit 93 with resistor 95 forming the emitter load. Neutralization is provided by capacitor 96 and resistor 97 connected in series between the base electrode and the secondary winding 98. The output of stage 32 is developed across tuned circuit 93. Secondary winding 98 forms the input to amplitude pulse detector stage 33. Bias is supplied to transistor 105 by resistor 108 and winding 98 connected in series between the emitter electrode and the negative side of the power source. Improved bias stabilization is obtained by connecting a diode 107 between the common junction of resistor 108, winding 98 and the positive side of the power source.

Pulses detected by detector 33 are passed by diode gate 34 and applied through filter network 35 consisting of capacitor 110 and resistors 116 and 117. Signals passed by high pass filter 35 are applied to pulse amplifier stage 36. Bias is supplied to transistor 115 by the voltage divider network formed by resistors 116 and 117. Operating voltage is supplied by resistor 118, connected between the emitter electrode and the negative side of the power source. The output of pulse amplifier stage 36 is direct current coupled to the input base electrode of pulse amplifier stage 37. Bias is supplied thereto by resistor 121 and inductor 122 connected in shunt therewith. To prevent ringing of inductor 122 on strong pulses, a diode 123 is also connected in shunt which clips reverse oscillations, thereby providing a damping action. The output of pulse amplifier stage 37 is coupled through coupling capacitor 124 to the input base electrode of pulse amplifier stage 38. Bias is supplied to transistor 130 by voltage divider network consisting of resistors 131 and 132. Operating voltage is obtained by connecting the emitter electrode directly to the negative side of the power source. The output of pulse amplifier stage 38 is applied through lead 140, resistor 141, diode 143, and a portion of coil 144 to the input emitter electrode of transistor 150 of the second radio frequency amplifier stage 15.

Transistor 150 is connected as a common base amplifier with bias being supplied to the base electrode by a voltage divider network across the power source and consisting of resistors 151, 152 and 153. The emitter electrode is maintained at a higher potential than the base electrode by returning the portion of coil 144 through resistor 154 to the positive side of the power source. The output of stage 15 is developed across tuned circuit 155 and coupled to subsequent stages of the receiver through coupling capacitor 156. Diode 157 is connected in shunt with tuned circuit 155 and whose function will be explained subsequently. A three position switch 160 is incorporated in the circuitry of the blanker and first radio frequency amplifier stage to control the mode of operation of the blanker and the gain characteristics of the receiver. Operation and specific function of the switch will be explained further on.

In operation, signals from antenna 10 are developed across winding 43 of transformer 42. Carrier signals are selectively developed across tuned circuit 41 and applied to the first radio frequency amplifier stage 12 from the junction of capacitors 45 and 46. A neon-light device 49 is further connected from antenna 10 to ground to discharge excessive static electrical energy above a predetermined level. In addition, a protective circuit is included to protect transistor 170 in the first radio frequency amplifier stage 12 from excessive on-frequency carrier signals. This circuit includes a silicon diode 47 connected in shunt with tuned circuit 41. Diode 47 is selected so as to remain non-conductive for applied voltages up to a predetermined value without additional biasing arrangements. When the carrier signal voltage exceeds this predetermined level, diode 47 conducts and presents a low impedance across tuned circuit 41, thereby decoupling transistor 170 of radio frequency amplifier stage 12 therefrom. The output of first radio frequency amplifier stage 12 is further selected by delay line 13 and applied to the input emitter electrode of the second radio frequency amplifier stage 15.

In the blanker channel, signals developed across antenna primary winding 43 are coupled to tuned circuit 50 and further applied to the input base electrode of transistor 57 of radio frequency amplifier stage 30 from the junction of capacitors 54 and 55. The signals are amplified and applied to radio frequency amplifier stages 31 and 32 respectively for further amplification. It is to be emphasized that radio frequency amplifier stages 30, 31 and 32 are preferably operative at a frequency other than the carrier signal frequency to improve the protection for the receiver from intermodulation products and like interferences. The tuned circuits 60, 80 and 93 in the collector electrode circuits of radio frequency amplifier stages 30, 31 and 32 respectively and tuned circuit 50 as part of antenna circuit 11 may be tuned to any desired frequency within a given frequency range. A meter circuit 200 is provided in the collector electrode circuit of transistor 90 and consists of resistor 202 and capacitor 203 in series and shunted by diode 201. An external meter may be connected to point *"m"* with a signal generator of the desired frequency coupled to antenna 10. Tuned circuits 50, 60, 68, 80 and 93 may then be adjusted for maximum deflection on the meter as an indication of proper tuning.

Tuned circuit 50 also includes a silicon diode 52 in shunt therewith to protect transistor 57 of blanker amplifier stage 30 from excessive signal levels. Diode 52 functions in the same manner as previously described for silicon diode 47 in tuned circuit 41.

Output signals from radio frequency amplifier stage 32 are developed across tuned circuit 93 and applied through secondary windings 98 to the input base electrode of the amplitude pulse detector stage 33 where impulse noise disturbances are detected as positive going pulses. The detected pulses are applied to diode gate 34 wherein only such detected pulses above a predetermined level of amplitude are passed and applied through to high pass filter 35 formed by capacitor 110 and resistor 116. Such level is determined by diode 99 in shunt with the tuned circuit 93 in the output circuitry of radio frequency amplifier stage 32. As mentioned previously, the radio frequency amplifier stages 30—32 of the blanker circuit preferably operate at a frequency other than the frequency of the carrier signal. Normally stages 30—32 amplify only impulse noise disturbances and inherent random, or "white," noise. In some instances, however, adjacent channel carrier signals may fall at or near the blanker frequency such that radio frequency signal energy is introduced therein. It is well known that by the injection of such radio frequency energy, the noise amplification will be increased since it is superimposed thereon. Without further provisions, such random noise may generate blanking pulses within the remaining circuitry of the blanker system. Diode 99 is biased to limit, or "clip," the level of possible extraneous radio frequency signals to a safe level of amplitude. Diode gate 34 therefore passes detected noise pulses from detector 33 above this level only, thereby preventing such false blanking action.

It can be further seen that capacitor 110 will be charged to a given value whenever a positive pulse is passed by diode gate 34. Since capacitor 110 can only discharge through the reverse impedance of diode 34, a time delay is encountered before gate 34 is ready to pass subsequent pulses. By connecting the second diode 109 in reverse polarity across diode gate 34, capacitor 110 may then discharge immediately after each gated pulse, thereby providing optimum recovery.

High pass filter 110—116 passes only those signals above the pass band range of the receiver, thereby eliminating amplitude modulation components and providing further protection for the receiver from intermodulation products. The filtering action, however, results in a foreshortening of the detected noise pulses. The filtered pulses are amplified to a predetermined level of amplitude in the pulse amplifier stages 36, 37, and 38 and appear as negative going pulses at the output collector electrode of pulse amplifier stage 38. The pulses are applied through line 140, resistor 141, isolating diode 143, and a portion of coil 144 to the input emitter electrode of the receiver second radio frequency amplifier stage 15. The blanking pulses are stretched to a predetermined time duration by an R-C network consisting of capacitors 133 and 142 and resistor 141.

The values of the various components comprising delay line 13 are selected such that the impulse noise disturbances accompanying the signal are delayed until after the blanking pulses are applied to the input emitter electrode of the receiver second radio frequency amplifier stage 15. Consequently, the stage is blanked off shortly before and during the occurrence of such impulse noise disturbances.

As mentioned previously, the receiver second radio frequency amplifier stage 15 is connected as a common base amplifier. This configuration provides maximum isolation between delay line 13 and the remainder of the receiver circuits whenever stage 15 is cut off by a blanking pulse. However, to provide further protection from signal leakage across the inherent capacity between emitter and collector electrodes, a clamping diode 157 is connected from the output collector electrode to the common junction of resistors 151 and 153 which normally biases the diode nonconductive. Upon the application of a blanking pulse to the base electrode of stage 15, a portion is conducted through diode 158, connected between the emitter electrode and the common junction of resistors 151 and 152 and the base electrode. This forward biases diode 157 conductive to clamp the collector electrode at a reference potential, thereby providing a low impedance shunt across the output of the stage 15 during the blanking action. Diode 158 also provides protection for transistor 150 from burn-out as well as providing a correct termination for delay line 13, thereby reducing ringing within the delay line.

FIGS. 2 and 3 illustrate various wave forms useful in portarying the action of the various receiver and blanker circuits. Curve A of FIG. 2 illustrates a carrier signal that might occur at the input of the receiver first radio frequency amplifier stage 12. A sharp impulse noise disturbance is shown superimposed upon the carrier wave signal. After the signal is amplified therein and fed through the delay line, the impulse noise is stretched by the selective circuits and delayed a given amount, as illustrated by curve B. This signal thus appears at the input of the receiver second radio frequency amplifier stage 15.

Since the blanker operates at a frequency other than the frequency of the carrier signal, normally only the impulse noise disturbances and the inherent random or background noise will be amplified in the radio frequency amplifier stages 30, 31 and 32 of the blanker circuit. The signal appearing at the output of radio frequency amplifier stage 32 is represented by curve F of FIG. 3. The impulse noise disturbances are detected in amplitude pulse detector 33 and may be represented as the wave form in curve G. The dotted line represents the limit maintained on the level of radio frequency energy by diode 99 in tuned circuit 93. Only pulses above this level are passed by diode gate 34. The pulses so passed are filtered by the high pass filter network and are represented by the wave form in curve H where it may be seen that the pulses so filtered are foreshortened in time duration. The detected and filtered pulses are amplified in pulse amplifier stages 36, 37 and 38 and stretched to a predetermined timed duration and may be represented by the waveform in curve I.

The blanking pulses so formed are applied to the input of the receiver second radio frequency amplifier stage 15. The delay line 13 produces a delay such that the blanking pulses arrive before the impulse noise disturbances to be blanked, as represented in curve C of FIG. 2 wherein the blanking pulse is shown as the dotted line. Upon application of a blanking pulse, radio frequency amplifier stage 15 is turned off for the duration of the applied pulse. Curve D represents the output of stage 15 showing the portion of carrier signal blanked out. The subsequent selective circuits of the receiver tend to restore the gap in energy as the signal is translated therein. Curve E illustrates this action.

As mentioned previously, switch 160 controls the blanker circuit mode of operation and the sensitivity of the first radio frequency amplifier stage 12 of the receiver. As indicated, switch 160 includes three terminals: "X," "Y" and "Z." In a first position, the arm of switch 160 contacts both "Y" and "Z" terminals. In this position, the negative source potential is applied by supply lead 163 to the blanker circuit to render it operative to generate blanking pulses in response to impulse noise disturbances.

Operating potential for transistor 170 of stage 12 is obtained through resistor 172 and coil 173 connected in series between the negative side of the power source and the collector electrode and is returned by resistor 171 connected between the emitter electrode and the positive side of the power source. A diode 164 and resistor 165 is further connected in series between the emitter electrode and lead 162. It can be seen that with switch 160 in the aforementioned first position, the negative potential so applied to diode 164 from supply lead 162 is sufficient to back bias diode 164 in the nonconductive state and the values of the components of stage 12 are selected to render transistor 170 operative at normal sensitivity or gain level.

In a second position, the arm of switch 160 may be moved to contact both terminals "X" and "Y." In this position, the positive source potential is applied to supply lead 163 and to supply lead 162 through series resistor 166. The positive potential applied through lead 163 to the blanker circuit therefore renders it inoperative to generate blanking pulses. The positive potential, however, applied to diode 164 is sufficient to render it conductive such that resistors 165 and 166 are effectively in shunt with resistor 171. The resistance in the emitter electrode of transistor 170 is therefore reduced. The increased current through transistor 170 results in a higher voltage drop such that the voltage at the collector electrode is reduced in value thereby reducing the effect of gain or sensitivity of the stage. Reduced sensitivity of stage 12 provides further protection from intermodulation and de-sensitization.

In a third open-center position, the arm of switch 160 contacts only terminal "Y." The negative source potential is applied to supply lead 163 with the dropping resistor 161 being operative to apply a reduced negative potential to supply lead 162. Such applied potential is sufficient to render the blanker circuit inoperative and further to back bias diode 164 such that the first radio frequency amplifier stage 12 is operative at normal sensitivity. In certain instances, however, very strong impulse noise disturbances applied to the blanking circuit may be of sufficient amplitude to trigger the blanker circuit whereby blanking pulses may be generated in response thereto since the reduced potential so applied by dropping resistor 161 may be in the order of three volts. To prevent a blanking response by second radio frequency amplifier stage 15, a diode 143 is included in the signal path between the bottom end of coil 144 and resistor 141. With switch 160 in the third open center position, the negative potential applied through lead 163 to the blanker circuit is sufficient to raise the voltage potential appearing at the collector electrode of transistor 130 in pulse amplifier stage 38 to a value higher than the potential applied to the emitter electrode of transistor 150 in second radio frequency amplifier stage 15. This has the effect of back biasing diode 143 such that in this condition any intermittent blanking pulses generated within the blanker circuit are prevented from being applied to stage 15.

Thus it can be seen that the mode of operation of the blanking circuit as well as the sensitivity of the receiver is effectively controlled by a supply lead and multiposition switch. The receiver may be operative at normal sensitivity without the blanker circuit operative; it may be operative at normal sensitivity with the blanker circuit operative; and it may be operative at reduced sensitivity without the blanker circuit operative to provide further protection from intermodulation and desensitization signals.

The present invention therefore provides an improved blanking circuit for a radio communications receiver which operates in the radio frequency portion of a communications receiver to improve the rate of blanking action and is further operative at a frequency other than the carrier signal frequency to minimize the loss of usable signal. Provisions are made to prevent intermodulation and related spurious components within the pass band range of the receiver from passing through the blanker circuit. Further, blanking pulses are prevented from being generated on random noise by a diode gate which passes only those detected noise pulses above a predetermined level of amplitude. Optimum protection from signal leakage through the blanked stage is provided by a clamping circuit across the output of the receiver stage so blanked. Provision is made to operate the receiver at normal sensitivity without the blanker circuit, to operate the receiver at maximum sensitivity with the blanker circuit, and to operate the receiver at reduced sensitivity without the blanker circuit.

What is claimed is:

1. In a frequency modulation receiver including a radio frequency amplifier stage for translating a desired carrier wave signal which may be accompanied by impulse noise disturbances and which stage is adapted to be interrupted by the application of blanking pulses thereto, and which receiver includes input circuit means for applying signals to said radio frequency amplifier stage; an impulse noise blanking system including in combination, radio frequency amplifier circuit means coupled to said input circuit means for amplifying signals of a given frequency, pulse detection means connected to said radio frequency amplifier circuit means for detecting noise pulses superimposed on said carrier wave signal, gate means connected to said pulse detector for passing detected noise pulses above a predetermined level of amplitude, high pass filter means connected to said gate means for rejecting signals within the pass band range of the receiver, said high pass filter means causing a foreshortening of said detected noise pulses, pulse amplifier means connected to said high pass filter means, means coupled to said pulse amplifier means for stretching said foreshortened noise pulses to form blanking pulses of a predetermined time duration, means for applying said blanking pulses to said radio frequency amplifier stage to interrupt the same, and means responsive to said blanking pulses coupled to the output of said radio frequency amplifier stage to clamp the same at a reference potential during the blanking action.

2. An impulse noise blanking system for use in a frequency modulated receiver including an antenna circuit and a radio frequency amplifier stage serving to translate carrier signals received from the antenna circuit which may include impulse noise disturbances of amplitudes greater than the desired signal, and wherein the radio frequency amplifier stage is adapted to be interrupted by the application of blanking pulses thereto; said impulse noise blanking system including in combination, radio frequency amplifying means adapted to be connected to the antenna circuit, pulse detection means connected to said radio frequency amplifying means for detecting noise pulses, diode gate means connected to said pulse detection means for passing therethrough detected noise pulses above a predetermined level of amplitude, filter means connected to said gate means and having a high pass characteristic to reject signal components within the band pass of the receiver, pulse amplifying means having a portion connected to said filter means and including pulse lengthening means to form blanking pulses of a predetermined time duration and amplification level, and means for applying said blanking pulses to the radio frequency amplifier stage at a time sequence preceding the application of said impulse noise disturbances.

3. An impulse noise blanking system for use in a frequency modulated receiver including an antenna circuit and a radio frequency amplifier stage serving to translate carrier signals received from the antenna circuit which may include impulse noise disturbances of amplitudes greater than the desired signal, and wherein the radio frequency amplifier stage is adapted to be interrupted by the application of blanking pulses thereto and has lengthened impulse noise disturbances therein, said impulse noise blanking system including in combination, radio frequency amplifying means connected to the antenna circuit, pulse detection means adapted to be connected to said radio frequency amplifying means for detecting noise pulses, diode gate means connected to said pulse detection means for passing therethrough detected noise pulses above a predetermined level of amplitude, filter means connected to said gate means and having a high pass characteristic to reject signal components within the band pass of the receiver, pulse amplifying means having a portion connected to said filter means and including pulse lengthening means to form blanking pulses of a predetermined amplification level and of a time duration greater than that of the lengthened pulses in the radio frequency amplifier stage, and means for applying said blanking pulses to the radio frequency amplifier stage at a time sequence preceding the application of said impulse noise disturbances, whereby the radio frequency amplifier stage is interrupted for the duration of said impulse noise disturbances.

4. A frequency modulation radio receiver including in combination, antenna circuit means, a first radio frequency amplifier stage having an input connected to said antenna circuit means and serving to translate a desired signal which may be accompanied by large amplitude disturbance pulses, delay means, a second radio frequency amplifier stage coupled to said first stage by said delay means and adapted to be interrupted by the application of blanking pulses thereto, and a noise blanking system including radio frequency amplifying means having an input circuit coupled to said antenna circuit means and an output circuit, pulse detector means including gate means for detecting and passing noise pulses above a predetermined level of amplitude, said pulse detector means having input and output circuits with said input circuit being connected to said output circuit of said radio frequency amplifying means, pulse amplifying means having input and output circuits, filter means interposed between the output circuit of said pulse detector and the input circuit to said pulse amplifying means, said filter means having a high pass characteristic to reject signal components falling within the pass band range of the receiver, said filter means causing a foreshortening of said detected noise pulses, pulse lengthening means coupled to said output circuit of said pulse amplifying means for forming blanking pulses of a predetermined time duration, said pulse lengthening means being connected to said second radio frequency amplifying stage to apply said blanking pulses thereto to interrupt the same, and diode clamping means responsive to said blanking pulses connected across the output of said second radio frequency amplifying stage to provide a low impedance thereacross during blanking action to prevent signal leakage.

5. An impulse noise blanking circuit for a frequency modulation receiver including antenna circuit means in which may appear a carrier wave signal accompanied by impulse noise disturbances of greater amplitude than the carrier signal, a radio frequency amplifier stage for repeating the carrier wave signal and adapted to be interrupted by a control signal, and wherein delay means is interposed between the antenna circuit means and the radio frequency amplifier stage; said impulse noise blanking circuit including amplifying and pulse detection means adapted to be coupled to the antenna circuit means for deriving noise pulses therefrom, gate means coupled to said pulse detection means for passing detected noise pulses above a predetermined level of amplitude and including filter means having a high pass characteristic to reject signal components falling within the pass band range of the receiver whereby said detected and gated noise pulses are foreshortened in time duration, pulse amplifying means coupled to said filter means and including pulse stretching means for stretching said foreshortened noise pulses to a predetermined time duration to form control signals, and coupling means for applying said control signals to the receiver radio frequency amplifying stage and in a time sequence to interrupt the same before the impulse noise disturbances are applied from the delay means.

6. In a superheterodyne receiver including antenna circuit means for developing signals therein and a radio frequency amplifier stage for repeating a desired signal which may be accompanied by impulse noise disturbances greater than the amplitude of the desired signal, and wherein the radio frequency amplifier stage is adapted to be interrupted by blanking pulses applied thereto; an impulse noise blanking circuit including amplifying means connected to the antenna circuit means, pulse detector means connected to said amplifying means for deriving noise pulses, gating means including a first diode connected to said pulse detector means for passing detected noise pulses above a predetermined level of amplitude and having an output circuit including a coupling capacitor for charging to a value proportional to the value of the detected pulse, second diode means connected in reverse polarity across said first diode means for discharging said capacitor when a pulse ceases, filter means connected to said gating means for rejecting signal components within the pass band range of the receiver whereby said detected noise pulses are foreshortened in time duration, pulse amplifying means connected to said filter means and including a resistance-capacitance network for stretching said filtered noise pulses to form blanking pulses of a predetermined time duration, coupling means for applying said blanking pulses to the receiver radio frequency amplifier stage to interrupt the same for the duration of the applied blanking pulse, and third diode means connected across the output of the receiver radio frequency amplifier stage and operative in response to said blanking pulses to present a low impedance thereacross to prevent signal leakage during the blanking action on the radio frequency amplifier stage.

7. A transistorized frequency modulation radio receiver including in combination, antenna circuit means, a first transistor radio frequency amplifier stage having an input connected to said antenna circuit means and serving to translate a desired signal which may be accompanied by large amplitude disturbance pulses, delay means, a second radio frequency amplifier stage including a second transistor having input, output and common electrodes, with said input electrode being coupled to said first stage by said delay means, said second stage being adapted to be interrupted by the application of blanking pulses thereto, and an impulse noise blanking system including radio frequency amplifying means having an input circuit coupled to said antenna circuit means and an output circuit, pulse detector means including gate means for detecting and passing noise pulses above a predetermined level of amplitude, said pulse detector means having input and output circuits with said input circuit being connected to said output circuit of said radio frequency amplifying means, pulse amplifying means having input and output circuits, filter means interposed between the output circuit of said pulse detector and the input circuit to said pulse amplifying means, said filter means having a high pass characteristic to reject signal components falling within the pass band range of the receiver, said filter means causing a foreshortening of said detected noise pulses, pulse lengthening means coupled to said output circuit of said pulse amplifying means for forming blanking pulses of a predetermined amplitude and time duration, said pulse lengthening means being coupled to said input electrode of said second radio frequency amplifying stage to apply said blanking pulses thereto to interrupt the same, a first diode connected between said input and said common electrodes of said second transistor in said second radio frequency amplifying stage, a power source, a voltage divider network connected across said power source, a portion of said network being coupled to said common electrode, and a second diode connected between the output electrode and a portion of said voltage divider network and normally biased non-conductive, said first diode serving to terminate said delay means and to couple a portion of the applied blanking pulse from said pulse amplifying means to said voltage divider network whereby said second diode is rendered conductive to provide a low impedance across the output of said second transistor during blanking action to substantially prevent signal leakage therefrom to the remainder of the receiver.

8. An impulse noise blanking circuit for a superheterodyne receiver including antenna circuit means for developing signals therein and a radio frequency amplifier stage for repeating a desired signal which may be accompanied by impulse noise disturbances greater than the amplitude of the desired signal, and wherein the radio frequency amplifier stage is adapted to be interrupted by blanking pulses applied thereto; said impulse noise blanking circuit including amplifying means having input and output circuits with said input circuit being adapted to be connected to the antenna circuit means, first diode means connected in shunt with said output circuit of said amplifying means to limit the output signal therefrom to a predetermined level of amplitude, pulse detector means connected to said output circuit of said amplifying means for deriving noise pulses, gating means including second diode means connected to said pulse detector means for passing detected noise pulses above said level of amplitude determined by said first diode and having an output circuit including a coupling capacitor for charging to a value proportional to the value of the detected pulse, third diode means connected in reverse polarity across said second diode means for discharging said capacitor when a pulse ceases, filter means connected to said gate means for rejecting signal components within the pass band range of the receiver whereby said detected noise pulses are foreshortened in time duration, pulse amplifying means connected to said filter means and including a resistance-capacitance network for stretching said filtered noise pulses to form blanking pulses of a predetermined time duration, and coupling means for applying said blanking pulses to the receiver radio frequency amplifier stage to interrupt the same for the duration of an applied blanking pulse.

9. A frequency modulation receiver including in combination, a first channel for receiving and translating radio frequency signals which may be accompanied by impulse noise disturbances, said first channel including a first radio frequency amplifier stage having input and output circuit means, a second radio frequency amplifier stage and a coupling circuit for applying a signal from the output of said first radio frequency amplifier stage to said second radio frequency amplifier stage with the signal so applied being delayed, a second channel including an impulse noise blanking circuit having an input coupled to said first radio frequency amplifier stage input circuit means and an output circuit coupled to said second radio frequency amplifier stage, said impulse noise blanking circuit including means for producing blanking pulses in response to impulse noise disturbances greater than the amplitude of said radio frequency signal and means for applying said blanking pulses to said second radio frequency amplifier stage to interrupt the same in a time sequence before the impulse noise disturbances are applied thereto from said coupling circuit, and switch means for selectively controlling the mode of operation of said first radio frequency amplifier stage and said impulse noise blanking circuit, said switch means having a first position for applying a first potential of a given value and polarity to said blanking circuit to render the same operative and to said first radio frequency amplifier stage for operation at maximum sensitivity, a second position for applying a second potential having a value less than said given value and of said same polarity to said blanking circuit to render the same inoperative and to said first radio frequency amplifier stage for operation at normal sensitivity, and a third position for applying a third potential of a reverse polarity to said blanking circuit to render the same inoperative and to said first radio frequency amplifier stage for operation at reduced sensitivity to thereby protect the receiver from intermodulation and other related spurious products.

10. A frequency modulation receiver including in combination, a first channel for receiving and translating radio frequency signals which may be accompanied by impulse noise disturbances, said first channel including antenna circuit means, a first radio frequency amplifier stage having a first transistor with input, output and common electrodes, said input electrode being connected to the antenna circuit means and said common electrode being connected to potential supply means through first resistance means, a second radio frequency amplifier stage having a second transistor with input, output and common electrodes and a coupling circuit for applying a signal from the output electrode of said first transistor to said input electrode of said second transistor with the signal so applied being delayed, a second channel including an impulse noise blanking circuit having an input coupled to the antenna circuit means and an output circuit including a first diode coupled to said second radio frequency amplifier stage, said impulse noise blanking circuit including means for producing blanking pulses in response to impulse noise disturbances greater than the amplitude of said radio frequency signal and means for applying said blanking pulses through said first diode to said second radio frequency amplifier stage to interrupt the same in a time sequence before the delayed impulse noise disturbances are applied thereto from said coupling circuit, and means for selectively controlling the mode of operation of said first radio frequency amplifier stage and said impulse noise blanking circuit, said means including switch means having a plurality of contacts selectively connected in different switch positions, a second diode and second resistance means connected in series with said common electrode of said first transistor to a voltage supply lead connected to a contact of said switch means, said voltage supply lead providing operating potential to said blanking circuit, means connecting contacts of said switch means to said potential supply means, said switch means having a first position to apply a voltage potential of a given value and polarity to said voltage supply lead to render said blanking circuit operative and to back bias said second diode non-conductive whereby said first transistor is rendered operative at maximum sensitivity, said switch means having a second position to apply a voltage potential of a reduced value and said same polarity to said voltage supply lead to render said blanking circuit substantially inoperative and to maintain said back bias on said second diode whereby said first transistor operates at full sensitivity, and wherein the output voltage produced by said blanking circuit to said first diode is higher in value than the voltage applied to the input electrode of said second transistor thereby providing a back bias to said first diode and decoupling said blanking circuit from said second radio frequency amplifier stage, said switch means having a third position to apply a voltage potential of a reverse polarity to said voltage supply lead to render said blanking circuit inoperative and to forward bias said second diode whereby said second resistance means is connected in shunt with said first resistance thereby increasing the current in said first transistor and decreasing the gain therein to provide further protection for the receiver from intermodulation and other related spurious products.

11. An impulse noise blanking circuit for a superheterodyne receiver including antenna circuit means for developing signals therein and a radio frequency amplifier stage for repeating a desired carrier wave signal which may be accompanied by impulse noise disturbances greater than the amplitude of the desired signal connected to said antenna circuit means, and wherein the radio frequency amplifier stage is adapted to be interrupted by blanking pulses applied thereto; said impulse noise blanking circuit including in combination, amplifying means for amplifying signals of a frequency range differing from the frequency of the carrier signal, said amplifying means having input and output circuits with said input circuit being connected to the antenna circuit means, first diode means connected in shunt with said output circuit to limit the radio frequency energy which may be included in the output signal to a predetermined level of amplitude, pulse detector means connected to said output circuit of said amplifying means for deriving noise pulses, gating means including second diode means connected to said pulse detector means and poled for passing detected noise pulses therethrough above said level of amplitude determined by said first diode and having an output circuit including a coupling capacitor for charging to a value proportional to the value of the detected pulse, third diode means connected in reverse polarity across said second diode means for discharging said capacitor when a pulse ceases, filter means connected to said gate means for rejecting signal components within the pass band range of the receiver whereby said detected noise pulses are foreshortened in time duration, pulse amplifying means connected to said filter means and including a resistance-capacitance network for stretching said filtered noise pulses to form blanking pulses of a predetermined time duration, and means for applying said blanking pulses to the radio frequency amplifier stage to interrupt the same for the duration of an applied blanking pulse.

12. A frequency modulation radio receiver including in combination, a first radio frequency amplifier stage having an input connected to antenna circuit means and serving to translate a desired signal which may be accompanied by large amplitude disturbance pulses, delay means, a second radio frequency amplifier stage coupled to said first stage by said delay means and adapted to be interrupted by the application of blanking pulses thereto, a noise blanking system including radio frequency amplifying means for amplifying signals of a given frequency and having an input circuit coupled to said antenna circuit means, pulse detector means connected to said amplifying means for deriving noise pulses, gating means including a first diode connected to said pulse detector means for passing detected noise pulses above a predetermined level of amplitude and having an output circuit including a coupling capacitor for charging to a value proportional to the value of the detected noise pulse, second diode means connected in reverse polarity across said first diode means for discharging said capacitor when a pulse ceases, pulse amplifying means having input and output circuits, filter means interposed between the output circuit of said pulse gating means and the input circuit of said pulse amplifying means, said filter means having a high pass characteristic to reject signal components falling within the pass band range of the receiver, said filter means causing a foreshortening of said detected noise pulses, pulse lengthening means coupled to said output circuit of said pulse amplifying means for forming blanking pulses of a predetermined amplitude and time duration, said pulse lengthening means being coupled to said input of said radio frequency amplifying stage for applying said blanking pulses to interrupt the same in a timed sequence before the impulse noise disturbances are applied thereto from said delay means, a third diode connected across the input of said second radio frequency amplifying stage and a fourth diode connected across the output thereof, voltage divider means coupled to said second radio frequency amplifier stage and to said third diode for normally biasing said diode non-conductive, said third diode serving to terminate said delay means and to couple a portion of the applied blanking pulse to said voltage divider means whereby said fourth diode is rendered conductive to provide a low impedance across said output of said second radio frequency amplifying stage during blanking action to prevent signal leakage therefrom, and switch means for selectively controlling the mode of operation of said first radio frequency amplifying stage and said impulse noise blanking circuit, said switch means having a first position for applying a potential of a given value and polarity to said blanking circuit to render the same operative and to the said first radio frequency amplifying stage for operation at maximum sensitivity, a second position for applying a potential of a reduced value and said same polarity to said blanking circuit to render the same inoperative and to said first radio frequency amplifying stage for operation at normal sensitivity, and a third position for applying a potential of a reverse polarity to render said blanking circuit inoperative and to said first radio frequency amplifying stage for operation at reduced sensitivity to provide further protection for the receiver from intermodulation and other related spurious products.

13. The combination of claim 1 wherein said radio frequency amplifier circuit means selects signals in a frequency range differing from the frequency of the desired carrier wave signal translated by the radio frequency amplifier stage of the receiver.

14. An impulse noise blanking system for use in a frequency modulated receiver including an antenna circuit and a radio frequency amplifier stage serving to translate carrier signals of a particular frequency received from the antenna circuit, and which signals may include impulse noise disturbances having amplitudes greater than the amplitude of the desired signal, and wherein the radio frequency amplifier stage is adapted to be interrupted by the application of blanking pulses thereto; said impulse noise blanking system including in combination, radio frequency amplifying means adapted to be connected to the antenna circuit, said radio frequency amplifying means selecting signals in a frequency range differing from the frequency of the received carrier signals, pulse detection means connected to said radio frequency amplifying means for detecting noise pulses, gate means connected to said pulse detection means for passing therethrough detected noise pulses above a predetermined level of amplitude, filter means connected to said gate means and having a high pass characteristic to reject signal components within the band pass of the receiver, pulse amplifying means having a portion connected to said filter means and including pulse lengthening means to form blanking pulses of a predetermined time duration and amplification level, and means for applying said blanking pulses to the radio frequency amplifier stage at a time sequence preceding the application of said impulse noise disturbances.

References Cited in the file of this patent

UNITED STATES PATENTS

| | | |
|---|---|---|
| 2,220,443 | Gabrilovitch | Nov. 5, 1940 |
| 2,527,617 | Berger | Oct. 31, 1950 |
| 3,014,127 | Vlasak | Dec. 19, 1961 |